Patented Aug. 25, 1925.

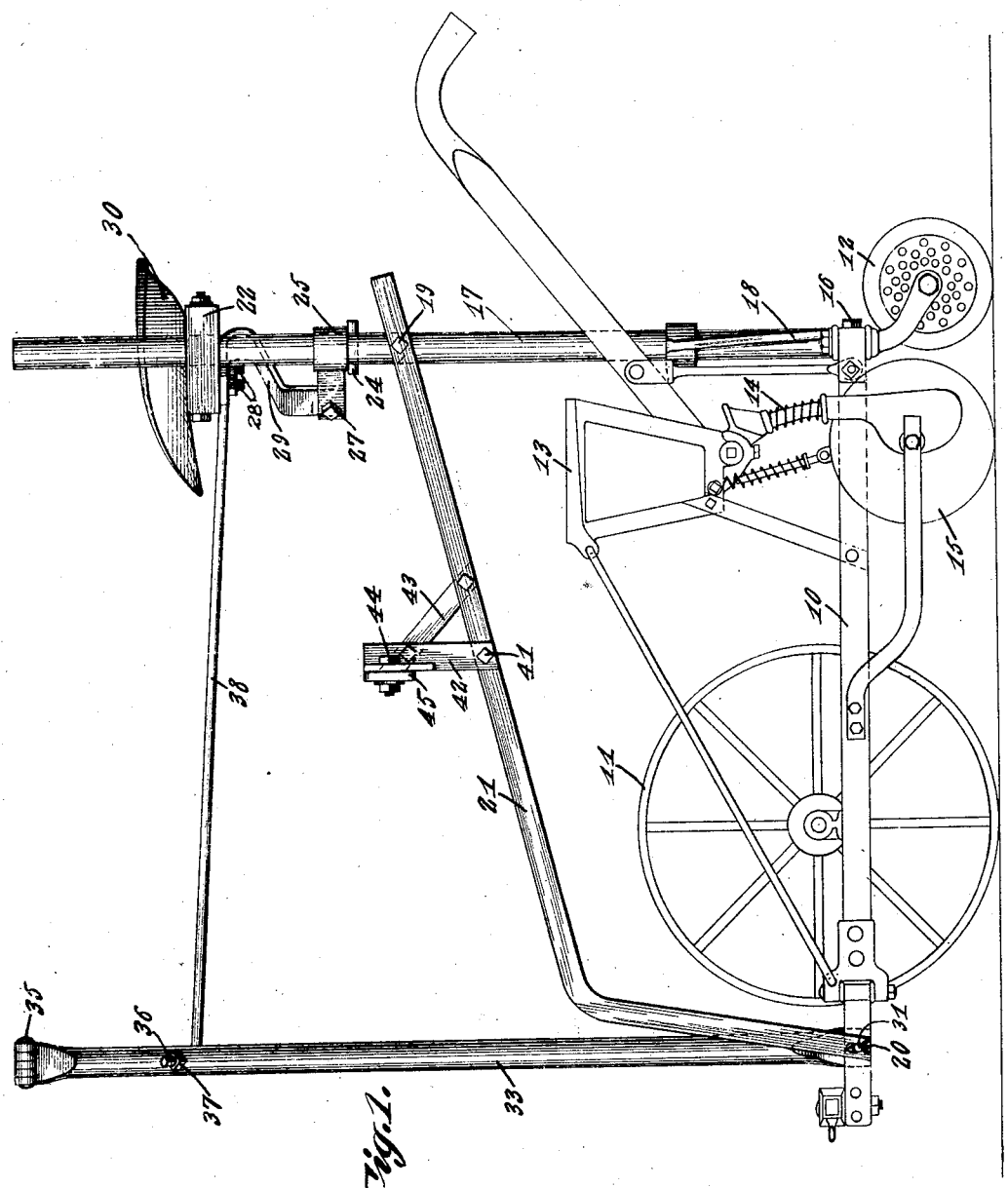

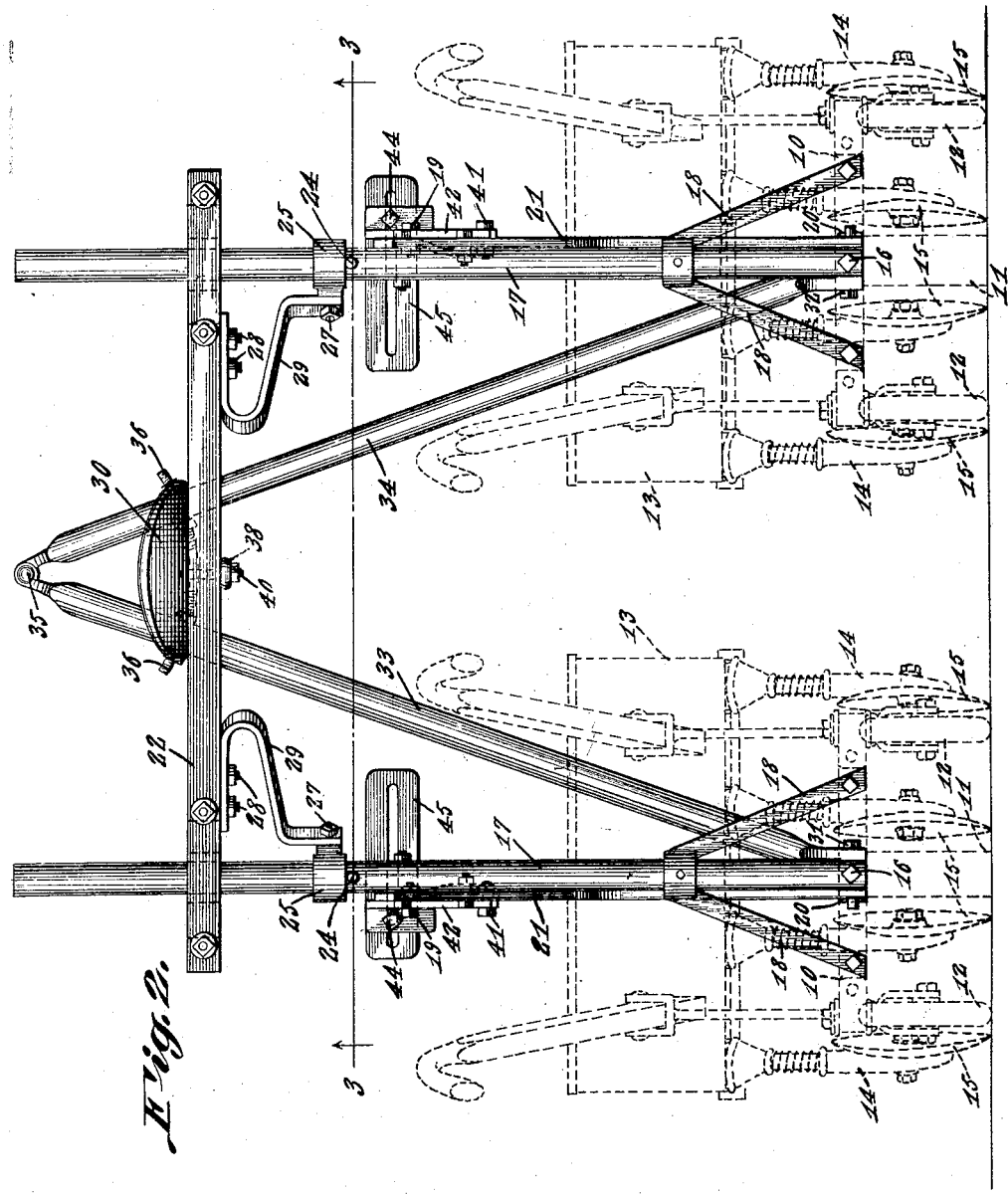

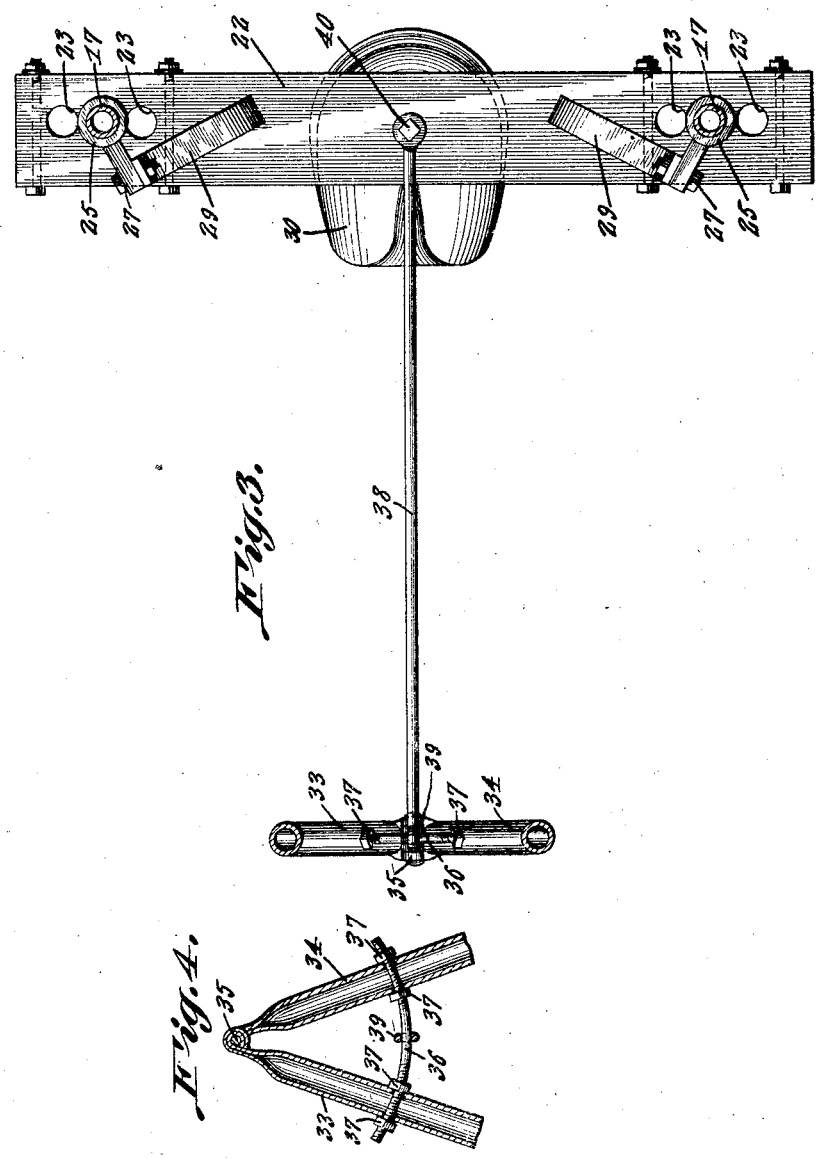

1,551,433

UNITED STATES PATENT OFFICE.

THOMAS SCHIMKOWITSCH, OF COLLYER, KANSAS.

PLANTER ATTACHMENT.

Application filed December 15, 1924. Serial No. 755,926.

*To all whom it may concern:*

Be it known that I, THOMAS SCHIMKOWITSCH, a citizen of the United States, residing at Collyer, in the county of Trego and State of Kansas, have invented certain new and useful Improvements in Planter Attachments, of which the following is a specification.

This invention relates to seeding machines, and has for one of its objects to provide simple and effectual devices for coupling two or more seeding machines to operate in unison, and adjustable laterally to vary the distance between the machines.

Another object of the invention is to provide a device of this character, which may be readily adapted without structural change to seeding machines of various forms and sizes.

With these and other objects in view the invention consists in certain novel features of construction as hereinafter shown and described and then specifically pointed out in the claim, and in the drawings illustrative of the preferred embodiment of the invention.

Fig. 1 is a side elevation, and

Fig. 2 is a rear elevation, of the improved device applied to two conventional seeding machines.

Fig. 3 is a bottom plan view of a part of the improved device.

Fig. 4 is a sectional detail of portions of the stay members.

The improved device is designed to be coupled to two or more seeding machines to enable them to be operated in unison, or side by side, and may be readily adapted without material structural change to seed planters of various construction and size, but for the purpose of illustration is shown applied to a pair of conventional seeders, each including a supporting frame 10, carrier wheels 11, caster wheels 12, seed hopper 13, seed dropper 14, coverer disks 15.

Attached at 16 to each of the frames 10, at the rear, is a standard 17, the latter suitably braced as shown at 18, from the frames. Connected preferably by cotter pins or the like at 19 and 20 respectively to the standards 17 and the frames 10 near their forward portions, are brace members 21.

By this means the standards are rigidly supported relatively to the seeder frames.

Slidably disposed upon the standards 17 is a seat support 22, and likewise adjustable laterally by a plurality of apertures 23.

Mounted on each of the standards 17 and supported rotatively thereon by pins 24 are brackets 25, and attached at 27 and 28 respectively to the brackets and to the seat support 22, are yieldable members 29, to provide for the necessary springiness to the support and the seat 30 which is attached thereto.

Attached to the frames 10 near their forward ends, by the same cotter pins 19 and 20 which secure the brackets, are stay members 33 and 34, the stay members converging toward their upper ends and hingedly united at 35.

The members 17—33 and 34 are preferably formed of sections of steam or gas piping as shown.

Extending through the members 33 and 34 is a rod 36, threaded at the ends, and provided with clamp nuts 37.

By this means the members 33 and 34 may be adjusted toward and away from each other and correspondingly adjust the seeder devices toward and away from each other, and locked in adjusted position by the nuts 37.

Provision is thus made for varying the distance between the rows, as required.

A brace rod 38 is formed with an eye 39 at one end to engage the adjusting rod 26, and is attached at 40 at the other end to the seat support 22, as shown. By this means the stay members are supported from the movable seat support 22.

Attached at 41 respectively to the braces 21 are standards 42, each standard being supported by an oblique brace 43.

Attached at 44 to each of the standards 42 is a longitudinally slotted plate 45, operative as a foot rest, and adjustable laterally to correspond to the lateral adjustments of the seeders.

The improved device is simple in construction, can be inexpensively manufactured and adapted to all the different makes of seeders and like machines, and provide for operating two seeders at the same time, and thus reducing the labor of time of seeding by one half.

By this device also two rows of wheat or the like may be sowed between two rows of corn or the like, and without injury to the corn, as each seeder can be drawn by a separate draft animal.

The preferred embodiment of the invention is disclosed in the drawings and set forth in the specification, but it will be understood that modifications within the scope of the claimed invention may be made in the construction without departing from the principle of the invention or sacrificing any of its advantages.

Having thus described the invention, what is claimed is:

In an apparatus of the class described, standards each adapted to be attached to the supporting frame of a seed planter at the rear thereof, brace elements connected at one end respectively to the standards and adapted to be connected at the other ends respectively to the forward ends of the planter frames, stay members hingedly coupled at their upper ends and adapted to be coupled at their lower ends respectively to the planter frames, means for laterally adjusting said stay members to correspondingly laterally adjust the planter frames, a seat support slidably and laterally adjustably engaging said standards, means for yieldably coupling said seat support to said standards, and a supporting rod connected to said seat support and to the adjusting means of the stay members.

In testimony whereof, I affix my signature hereto.

THOMAS SCHIMKOWITSCH.